(No Model.)

G. W. BAKER.
Oxidation Furnace.

No. 238,270.   Patented March 1, 1881.

2 Sheets—Sheet 1.

(No Model.)   G. W. BAKER.   2 Sheets—Sheet 2.
Oxidation Furnace.
No. 238,270.   Patented March 1, 1881.
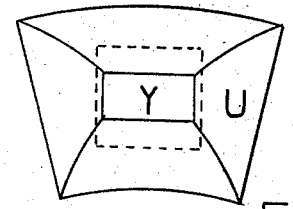
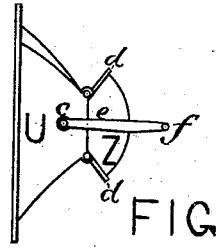
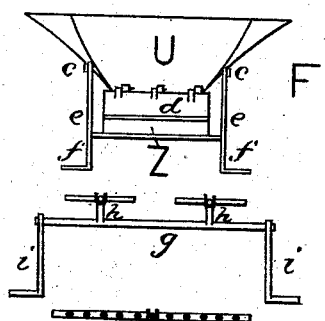
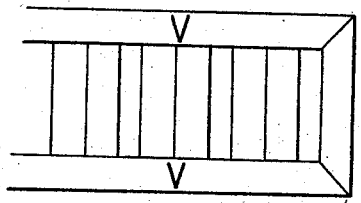
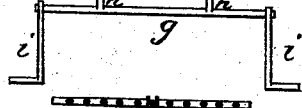
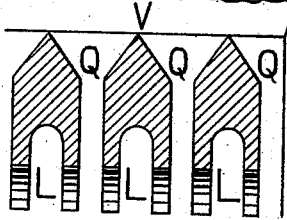
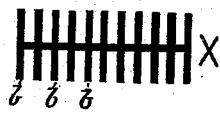
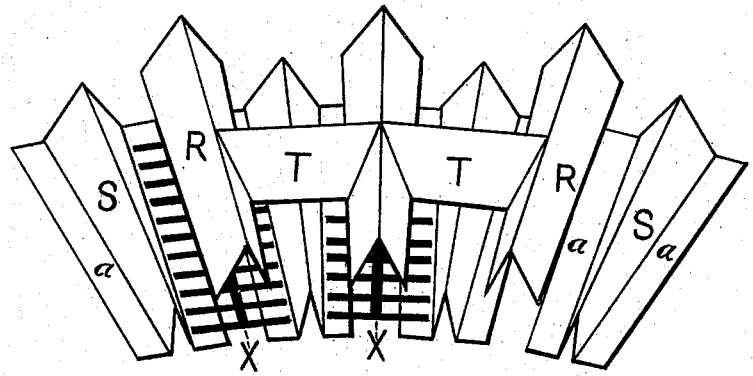
WITNESSES:　　　　　　　　　　　　INVENTOR
John B. Bernadou　　　　　　　　George W. Baker
Henry M. Dechert　　　　per　Norris & Rutter
　　　　　　　　　　　　　　　　　ATTORNEYS

UNITED STATES PATENT OFFICE.

GEORGE W. BAKER, OF PHILADELPHIA, PENNSYLVANIA.

OXIDATION-FURNACE.

SPECIFICATION forming part of Letters Patent No. 238,270, dated March 1, 1881.

Application filed July 10, 1880. (No model.)

*To all whom it may concern:*

Be it known that I, GEORGE W. BAKER, a citizen of the United States, residing at Philadelphia, in the county of Philadelphia and State of Pennsylvania, have invented a new and useful Furnace for the Oxidation of Sulphide Ores in the Lump, of which the following is a specification.

The object of my invention is to provide a furnace, continuous in its action, that will economically and completely oxidize large quantities of sulphide ores in the lump as they come from the mine—the rich ores with the poor ores.

The methods and appliances for oxidizing sulphide ores are very numerous. The larger body of auriferous ores in almost all mining districts contains massive and disseminated auriferous pyrites. The former can be submitted to smelting with profit. The latter must either be concentrated by some expensive process or milled in their natural state, when they give up the noble metals at a very considerable loss of value. Although invention has been active and persevering in the direction of a proper preparation of such ores for the closer extraction of their value, the advances made fail to supply the great need—viz., the cheap oxidation of the abundant supply of low-grade pyritical ores.

The object of my invention is to fill that requirement and save to the commercial world a very important amount of the precious metals now wasted. The difficulty rests, not in perfectly oxidizing, but in effecting the oxidation cheaply in large quantity, with uniformity of result. To do this by the furnace method three essential requirements must be conformed to—control of the circulation of the oxidizing agents, control of the temperature, and control of the feeding and discharging, so that they may be continuous and uniform and yet allow the ore to be retained under the conditions of oxidation at the will of the operator.

The invention consists in the manner of admitting the oxidizing agents into and the withdrawal of the gaseous products from the roasting-chamber; in the methods provided for the continuous discharging of the ores, and in the form of the bottom of the roasting-chamber.

Figure 1:
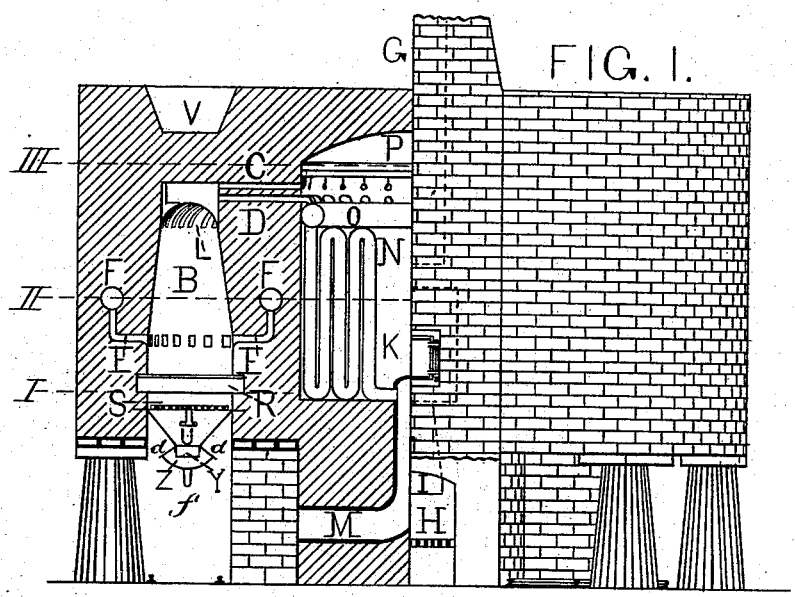
Figure 2:
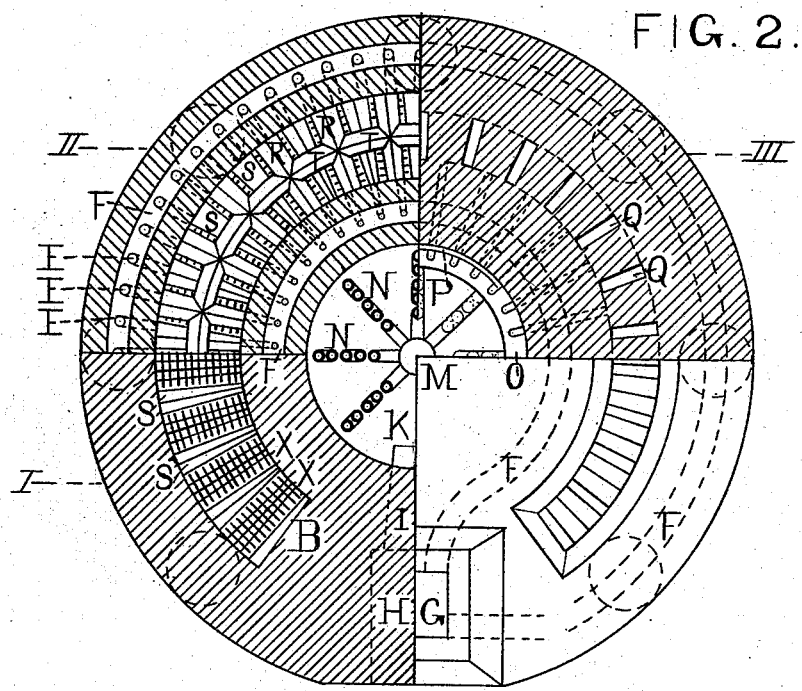

In the accompanying drawings, in which similar letters of reference denote like parts, Figure 1 represents an elevation of the furnace with a vertical section through the center; Fig. 2, a plan with horizontal sections through I, II, and III, Fig. 1. Fig. 3 shows the arrangement of the grate-bars in the bottom of the roasting-chamber. Figs. 4, 4ª, and 4ᵇ represent a plan of a discharge-hopper with end and side elevations. Fig. 5 is a plan and vertical section of the top of the furnace over the roasting-chamber, showing the combustion-chambers and the method of feeding the ore to the furnace. Fig. 6 represents an end and a side view of a set of agitating-bars with the arrangement by which they may be shaken, and also a plan of one of the bars with its lateral prongs.

The furnace is of a cylindrical form, having a roasting-chamber, B, Figs. 1 and 2, of annular horizontal cross-section, running completely around the furnace, with the exception of a space left in the front part for the fire-place. If more convenient the fire-place may be put in the center of the furnace and the roasting-chamber continued around. This chamber has numerous flues, C C C D D D, at the top, for the introduction of gaseous fuel and atmospheric air, and lower down exit-flues E E E, on each side, connecting immediately with the main flues F F, running around the chamber—one inside, the other outside—which communicate with the stack G.

H is the fire-place, which may be arranged either for an imperfect combustion of the fuel or for the destructive distillation of some substance rich in the hydrocarbons. The gases from this combustion or distillation rise through the flue I at the back of the fire-place into the heating-chamber K, and thence into the combustion-chambers L L through the flues C C C. Air is forced through the pipe M and the heaters N N, where it is raised to a higher temperature, into the drum O, from which it enters the combustion-chambers through the various flues D D D. The top of the roasting-chamber is arched over from side to side, and through this arching, at regular intervals around, are radial openings Q Q Q, Figs. 2 and 5, running upward to the gutter V, also Fig. 1. This gutter is sunk into the top of the furnace and runs around above the roasting-chamber. It is kept always filled with fresh ore, which gradually falls into the roasting-chamber B through the openings Q Q Q as the calcined ore is withdrawn from below. Sheet-iron plates lined with soapstone are put over the gutter, which prevent any escape of the gases, and which may be lifted off during the process of charging.

Between the feed-openings and running upward a short distance from the roasting-chamber are combustion-chambers L L L, Figs. 1 and 5. One gas-flue C and one air-flue D run into each of these chambers, and here it is that the combustion first takes place.

The bottom of the roasting-chamber is composed of two lines of V-shaped grate-bars placed transversely across the chamber, the bars of the lower line, S S S, Figs. 1, 2, and 3, alternating with the bars R R R of the upper line. The bars of the lower line have on each side a level flange, $a$, running the length of the bar, and the bars of the upper line are connected between their centers by a series of V-shaped bars, T T T. Between the bars of the lower line are agitating-bars X X, Figs. 1, 2, 3, and 6. These bars have on each side a number of lateral prongs, $b\ b\ b$, Fig. 6, projecting from them and resting on the side flanges of the grate-bars. This form of bottom insures a steady, uniform, and perfectly controllable descent of the ore in the chamber. The transverse grate-bars, owing to their triangular shape and to the method of placing them in two lines alternately, support the body of ore without affording a permanent resting-place to any of the pieces of ore. The side flanges, $a\ a$, of the lower line of bars, with the agitating-bars X X and their lateral prongs $b\ b\ b$, prevent any heavy run of ore, and allow only a slight escape through the spaces between the side flanges and the lateral prongs. This escape may be accelerated by agitating the bars with their prongs along the side flanges. The cross-bars T T T, Figs. 2 and 3, effectually prevent any run of ore down the center of the roasting-chamber and insure a uniform descent throughout the chamber. The done ore is withdrawn from the furnace by means of a series of hoppers, U, Fig. 1, arranged around underneath the roasting-chamber, each hopper taking the ore falling from two of the spaces between the grate-bars of the lower line.

U, Figs. 4, $4^a$, and $4^b$, is a hopper of the form of an inverted truncated quadrilateral pyramid, having extending downward a rectangular bottomless box, Y, Figs. 1 and 4. Below this box and suspended from above is a cylindrical bucket, Z, the length of the suspending-arm $e$ being equal to the radius of curvature of the bottom of the bucket. At the bottom of the hopper are hinged two flaps, $d\ d$, one on each side, fitting closely on the lateral edges of the bucket, thereby preventing the entrance of any air. By means of the handles $ff$ the bucket Z may be pushed aside, making an opening into the hopper, through which the ore will fall. Upon moving the bucket back to its first position the opening will be closed and the fall of ore stopped. By this means the operator can at any time withdraw any amount of ore from the furnace, and so perfectly control the time during which the ore should be subjected to the influence of the heated gases in the roasting-chamber. The flaps $d\ d$ are prevented from dropping by pieces of metal cast on at the hinge, Fig. 1, which project from them and almost touch the sides of the box Y when the bucket is in the position represented in the drawings. As each hopper takes ore continually from the same individual part of the roasting-chamber the several hoppers practically divide the chamber into a like number of smaller chambers, thus obviating the use of division-walls. The agitating-bars are divided into sets of two—one set to each hopper—and are shaken by the arrangement shown in Fig. 6. A long bar, $g$, runs through the hopper, having two lever-arms, $h\ h$, which clasp the agitating-bars X X at their centers. Two handles, $i\ i$, are keyed to the bar $g$, outside of the hopper, one on each end. By shaking the handles the motion will be obviously communicated to the agitating-bars.

The vertical roasting-chamber B, having an annular horizontal cross-section, has large capacity, and, owing to the arrangement of the entrance and exit flues, a rapid and perfect circulation of the oxidizing-gases throughout the entire chamber. The gases from the fire-place coming through the flues C C C, Figs. 1 and 2, are met in the combustion-chambers by a rush of heated air through the flues D D D, when a violent combustion takes place, which is thrown downward upon the broken ore in the roasting-chamber, permeating the whole mass and gradually raising it to a high temperature, burning the sulphur contained therein, and thoroughly oxidizing the entire contents of the chamber. This constantly-changing atmosphere is extremely necessary for a roasting-furnace, for a sulphide ore will melt at a very low temperature unless the gases are conducted away as fast as evolved, and fresh oxygen supplied, and as soon as melting commences oxidation stops and the furnace ceases working successfully. Should the heat of the combustion become too great it may be controlled by passing steam into the combustion-chambers through the gas-flues C C C and the drum P. The steam-drum P is connected with a steam-boiler, and runs completely around the interior of the heating-chamber K immediately above the gas-flues C C C, dropping a steam-jet into each gas-flue. Steam has a high specific heat, and will therefore absorb great quantities of heat, thus affording a perfect means of controlling the temperature of the roasting-chamber. The space in the feed-openings between the top of the roasting-chamber and the top of the furnace is kept filled with fresh ore, which absorbs and stores up any heat that may be radiated above. The space between the exit-flues and the grate-bars is filled with done ore, which prevents any loss of heat by radiation below, and which is gradually withdrawn by means of the hopper U. Thus we have a zone of combustion in which all the reactions take place between two strata—a stratum of fresh ore above and a stratum of done ore below—preventing a loss of heat and allowing a method of uniform feeding and discharging of the ores to be accomplished.

What I claim, and desire to secure by Letters Patent, is—

1. In an oxidizing-furnace, the combination of a retort-chamber having a series of gas and air delivery and exit flues with a series of discharge-hoppers, and a series of agitating-bars arranged with the same, substantially as shown and described.

2. The double bottom of a roasting-chamber of an oxidizing-furnace, consisting of transverse V-shaped bars, alternating one above the other, the bars of the lower line having on each side a level flange running the length of the bar, and the bars of the upper line being connected between their centers by a longitudinal V-shaped bar, in combination with the agitating-bars having lateral prongs lying between the bars of the lower line and resting on their side flanges, substantially as shown and described.

3. In a discharge-hopper, the combination of the pyramid U, box V, bucket Z, and flaps d d, substantially as shown and described.

GEORGE W. BAKER.

Witnesses:
HENRY T. DECHERT,
H. LAUSSAT GEYELIN.